(12) United States Patent
Stratis et al.

(10) Patent No.: US 9,698,458 B2
(45) Date of Patent: Jul. 4, 2017

(54) UWB AND IR/OPTICAL FEED CIRCUIT AND RELATED TECHNIQUES

(71) Applicant: Raytheon Company, Waltham, MA (US)

(72) Inventors: Glafkos K. Stratis, Tucson, AZ (US); Douglas Mills, Tucson, AZ (US); Kevin R. Hopkins, Tucson, AZ (US); Raymond A. Graffam, Tucson, AZ (US); David J. Knapp, Tucson, AZ (US); Michael S. Smith, Oro Valley, AZ (US)

(73) Assignee: Raytheon Company, Waltham, WA (US)

( * ) Notice: Subject to any disclaimer, the term of this patent is extended or adjusted under 35 U.S.C. 154(b) by 0 days.

(21) Appl. No.: 14/836,091

(22) Filed: Aug. 26, 2015

(65) Prior Publication Data
US 2017/0062894 A1    Mar. 2, 2017

(51) Int. Cl.
*G02B 6/00* (2006.01)
*H01P 3/08* (2006.01)
*G02B 6/028* (2006.01)

(52) U.S. Cl.
CPC ............... *H01P 3/087* (2013.01); *G02B 6/00* (2013.01); *G02B 6/028* (2013.01); *H01P 3/084* (2013.01); *H01P 3/088* (2013.01)

(58) Field of Classification Search
None
See application file for complete search history.

(56) References Cited

U.S. PATENT DOCUMENTS

| 4,282,527 | A |   | 8/1981  | Winderman et al. |
|-----------|---|---|---------|------------------|
| 5,471,181 | A | * | 11/1995 | Park ............... H01P 5/028 333/246 |
| 5,650,793 | A | * | 7/1997  | Park ............... H01Q 21/005 333/114 |
| 5,872,545 | A | * | 2/1999  | Rammos ......... H01Q 21/0075 343/700 MS |

(Continued)

FOREIGN PATENT DOCUMENTS

EP           04049704         2/1992

OTHER PUBLICATIONS

Shafai, et al.; "Loss Reduction in Planar Circuits and Antennas Over a Ground Plan Using Engineered Conductors;" 2013 7th European Conference on Antennas and Propagation (EuCAP); IEEE; 2013; pp. 1020-1024.

(Continued)

*Primary Examiner* — Tina Wong
(74) *Attorney, Agent, or Firm* — Daly, Crowley, Mofford & Durkee, LLP

(57) ABSTRACT

A radio frequency (RF) module having a plurality of channels includes a heat sink having at least one tapered edge; a substrate disposed over a surface of the heat sink such that the tapered edge of the heat sink extends past a boundary of the substrate. RF, logic and power circuitry is disposed on the substrate and one or more RF signal ports are formed on an edge of the substrate to allow the RF module to be used in an array antenna having a brick architecture. The tapered edge heat sink provides both a ground plane for RF signal components and a thermal path for heat generating circuits disposed in the substrate.

10 Claims, 5 Drawing Sheets

(56) References Cited

U.S. PATENT DOCUMENTS

| | | | | |
|---|---|---|---|---|
| 5,977,915 | A * | 11/1999 | Bergstedt | H01P 3/081 |
| | | | | 333/238 |
| 6,023,210 | A * | 2/2000 | Tulintseff | H01P 5/028 |
| | | | | 333/238 |
| 6,366,185 | B1 * | 4/2002 | Keesey | H01P 5/085 |
| | | | | 333/246 |
| 6,456,861 | B1 | 9/2002 | Hidaka et al. | |
| 6,545,572 | B1 * | 4/2003 | Ohta | H01P 5/028 |
| | | | | 333/246 |
| 6,552,635 | B1 * | 4/2003 | Sherman | H01P 3/087 |
| | | | | 333/238 |
| 6,801,172 | B1 | 10/2004 | Schwengler | |
| 7,102,581 | B1 | 9/2006 | West | |
| 7,471,175 | B2 * | 12/2008 | Voss | H01P 3/081 |
| | | | | 333/245 |
| 8,230,581 | B1 | 7/2012 | Wilcoxon et al. | |
| 9,214,899 | B2 * | 12/2015 | Plahn | H03F 3/602 |
| 9,405,064 | B2 * | 8/2016 | Herbsommer | H05K 1/0243 |
| 2008/0023804 | A1 | 1/2008 | Dutta | |
| 2009/0158581 | A1 * | 6/2009 | Nguyen | H05K 3/108 |
| | | | | 29/592.1 |
| 2012/0038539 | A1 | 2/2012 | Chang | |
| 2013/0241791 | A1 * | 9/2013 | Anderson | H01Q 15/008 |
| | | | | 343/848 |
| 2014/0266934 | A1 | 9/2014 | Cook et al. | |
| 2015/0061795 | A1 * | 3/2015 | Milroy | H01P 3/00 |
| | | | | 333/24 R |
| 2015/0180203 | A1 * | 6/2015 | Kinugawa | H01S 5/162 |
| | | | | 372/45.01 |

OTHER PUBLICATIONS

Sipal, et al.; "Optimisation of Low Power Radio-Over-Fibre Links for UWB Systems;" 2011 IEEE International Conference on Ultra-Wideband (ICUWB); Sep. 14, 2011; pp. 600-604; 5 pages.

PCT Search Report of the ISA for PCT/US2016/030506 dated Jul. 26, 2016.

PCT Written Opinion of the ISA for PCT/US2016/030506 dated Jul. 26, 2016.

U.S. Appl. No. 14/971,223, filed Dec. 16, 2015, Stratis, et al.

PCT Search Report of the ISA for Int'l Appl. No. PCT/US2016/041872 dated Sep. 26, 2016; 7 pages.

PCT Written Opinion of the ISA for Int'l Appl. No. PCT/US2016/041872 dated Sep. 26, 2016; 10 pages.

* cited by examiner

UWB AND IR/OPTICAL FEED CIRCUIT AND RELATED TECHNIQUES

BACKGROUND

As is known in the art, waveguide structures may be fed with a feed line. For example, as show in FIG. 1, a suspended air stripline (SAS) 10 may be disposed in a waveguide 12 leading to an aperture of an antenna (not shown). Such feed lines typically operate over a relatively narrow bandwidth and with a single polarization.

As is also known, there is a trend in radio frequency (RF) systems to operate with multi spectra (i.e. multi frequency) polarimetric signal processing. Thus, current feed lines used in waveguide structures limit the ability to provide multi-spectral signal processing systems.

In certain applications, multiple feed lines have been provided in a microstrip configuration by using multiple conductors having a relatively lossy dielectric material disposed therebetween. The use of laminated conductors has also been proposed as a way to reduce losses due to conduction current and ohmic losses in the conductors. The laminating thickness is smaller or on the order of the skin depth of the conductor.

FIG. 2, illustrates a prior art microstrip transmission structure 14 provided from multiple laminated conductors which form a composite conductor. The transmission structure is provided from a polystyrene substrate 16 having a ground plane 18 disposed over a first surface thereof and a conductor 20 disposed over a second, opposite surface thereof. Four (4) layers 22a-22d of lossy dielectric material (e.g. Rogers 6002) are disposed over conductor 20 with each layer 22a-22d having a conductor 24a-24d disposed thereover.

This structure has reduced ohmic loss in the microstrip conductors compared with the ohmic losses which occur in prior art microstrip structures provided from a single solid conductor. While such an approach shows some improvement compared with prior art approaches, increased improvement is still required in many applications.

SUMMARY

In accordance with the concepts, systems, circuits and techniques described herein, an ultra wideband (UWB) feed circuit is provided from an optical substrate disposed over a multi-layer dielectric substrate with each layer being provided from a material having a relatively low relative dielectric constant. Conductor layers are disposed between at least a pair of the dielectric substrates which make up the multi-layer dielectric substrate. The multi-layer dielectric substrate is, in turn, disposed over a suspended air stripline (SAS) signal path comprised of a substrate having a conductor disposed thereover. The optical substrate, multi-layer dielectric substrate and SAS are disposed in a radio frequency (RF) waveguide.

With this particular arrangement, an ultra wideband (UWB)/optical waveguide feed line is provided. By combing a multilayered RF feedline substrate with an optical substrate which forms an optical waveguide and disposing the combination in an RF waveguide, a UWB feed capable of feeding an antenna with a waveguide aperture while also supporting signals at multiple frequencies/wavelengths, including optical/infrared (IR) wavelengths, is provided. By including different substrate materials in the RF waveguide, a waveguide feed circuit is provided which supports propagation of signals at both RF and optical/IR wavelengths.

Including the optical substrate in the waveguide widens the frequency bandwidth over which the RF portion of the waveguide feed operates thereby resulting in a UWB feed. The multi layered feed lines support multiple frequencies because of the skin effect of the metallic layers at various frequencies while the optical substrate disposed over the multi layered feed lines improves the performance of the RF feed portion by allowing the RF feed to operate over a wide frequency bandwidth. Furthermore, disposing the optical substrate over the multi layered feed lines allows both RF and optical/IR signals to be provided to a single aperture.

The addition of an optical substrate to the RF waveguide results in a UWB RF feed and also adds significant capabilities including, but not limited to use of the optical substrate as an optical waveguide that feeds an optical device (lens, etc). Such an optical device may be disposed at a center of an RF antenna aperture, for example. Furthermore, including the optical substrate among the feed lines improves RF insertion loss and bandwidth performance as compared to insertion loss and bandwidth performance which may be achieved using prior art technique (e.g. use of laminated conductors and a relatively lossy dielectric disposed therebetween). Furthermore, inclusion of the optical substrate in a waveguide allows a combination of optical/IR and RF fed antenna apertures wherein the optical/IR and RF fed apertures are co-located (i.e. a waveguide fed aperture having collocated optical and elements in the RF aperture).

In one embodiment, the optical substrate may be provided having one or more optical light pipes disposed, formed or otherwise provided therein. Some or all of the one or more light pipes may be selected to propagate light at the same wavelength. Alternatively, each of the one or more light pipes may be selected to propagate light at different wavelengths. Alternatively still, some of the one or more light pipes may be selected to propagate light having a first wavelength while others of the one or more light pipes may be selected to propagate light having different wavelengths (e.g. different from the first wavelength and also different from each other).

Furthermore, all of the one or more light pipes may be selected to propagate light having the same polarization. Alternatively, some or all of the one or more light pipes may be selected to propagate light having a first polarization (i.e. the same polarization) while others of the one or more light pipes may be selected to propagate light having different polarizations (e.g. different from the first polarization and also different from each other). Alternatively still, each of the one or more light pipes may be selected to propagate light having different polarizations. Alternatively still, some of the one or more light pipes may be selected to propagate light of different polarizations while others of the one or more light pipes may be selected to propagate light of the same polarization. Thus, the UWB/optical waveguide feed circuit described herein adds polarization capabilities.

This is in contrast to prior art single feed lines which allow propagation of signals having a single polarization.

Moreover, adding an optical waveguide to an RF waveguide feed creates a number of new opportunities to provide systems having multi sensing capabilities. For example, including the optical substrate in an RF waveguide allows RF and optical apertures to be fed through a single aperture. Thus, with the structure and techniques described herein, it is possible to collocate RF and optics without interfering with each other. This creates opportunities in the optical/IR areas since optical/IR capabilities can be added to RF systems with requiring more space. Furthermore, space savings resultant from the structures and techniques described herein can be used to support other applications or structures, if necessary. The UWB-optical/IR waveguide feed line described herein thus enables the development of multi-mode sensors in a compact package Accordingly, the UWB-optical/IR feed method and structure described herein allows UWB spectroscopy which may result in improvements in dynamic radar cross-section (RCS) tracking which capability is not available using presents systems.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Figure 3:
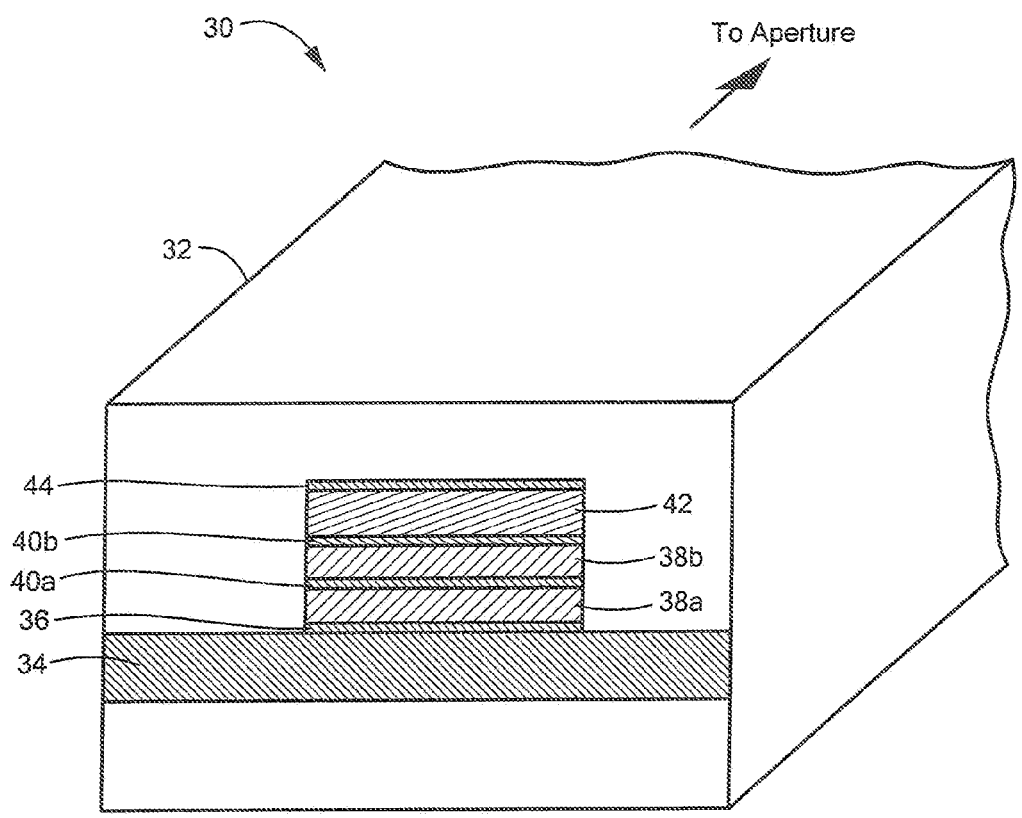
FIG. 3 is an isometric, partial, cross-sectional view of a waveguide feed circuit appropriate for use in both ultra wide band (UWB) and optical/infrared applications.

Referring now to FIG. 3, an ultra wide band (UWB) and optical feed circuit 30 includes a rectangular waveguide 32 having a substrate 34 disposed therein. In at least some embodiment, substrate 34, is optional, since the dielectric/layers can be located directly on the floor or bottom of the wave guiding structure. In embodiments which include substrate 34 (e.g. as illustrated in FIG. 3), the dielectric constant is very low, close to free space, and therefore does not affect the desired frequencies of operation. The substrate 34 functions as a mechanical support structure. Thus, substrate 34 may be provided having a relative dielectric constant close to that of free space. There are materials known having almost free space dielectric constant which are used for support purposes without affecting the operation of a particular design.

A conductor 36 is disposed over a first surface of substrate 34. In some embodiments conductor 36 may be provided as copper, gold or any other suitable material having a suitable conductivity. In the type of configuration, illustrated in FIG. 1, nickel, for example, may cause performance issues, because its conductivity is significantly different from gold and copper. Thus, if Nickel were used, other adjustments have to be done, such as changes of the dielectric constants of the dielectrics materials involved etc. For this particular configuration, use of materials having a conductivity which is substantially the same as or similar to copper or gold, no significant changes are needed on the illustrated design. It should of course, be appreciated that each particular type of conductor (e.g., copper, nickel, gold, etc) have different conductivities, different skin depths etc, which may impact the overall design and therefore the results shown in FIG. 5 may be affected.

The thickness and width of conductor 36 is selected to be much smaller than the skin depth, which is related to the frequencies of operation and the conductivity of the particular metallic conductor.

The width is many times greater than the thickness, but on the other hand the width dimension is small enough to reduce (and ideally minimize) any coupling effects with the walls (sides) of the waveguide, or capacitive effects between the conducting layers. In other words, it is preferred that the width not be too close to the vertical walls of the waveguide, because this would cause coupling between the conductor 36 and the vertical walls and consequently result in performance degradation of the design.

A plurality of alternating dielectric layers 38a, 38b and conductive layers 40a, 40b are disposed over the substrate and conductor 34, 36. The width of conductor 36 is selected to match the width of substrates 38a, 38b based upon the design requirements. The dielectric slabs 38a, 38b may be provided from a relatively lossy material such as Rogers R6002 or any material having equivalent mechanical and electrical characteristics. It should be appreciated that layers 38a, 38b are preferably provided from a lossy material having dielectric properties which change with increasing frequency (i.e. the materials become more lossy with increasing frequency such that the losses become higher at higher frequencies). More specifically, the conductivity goes up at higher frequencies. The materials are referred to as "lossy" to indicate that there is real and imaginary portion associated with the dielectric constant. A lossless material is when the imaginary part of the dielectric constant is almost zero or substantially zero. Because the imaginary part is associated with conductivity, zero imaginary part implies that the conductivity of lossless materials is also zero, i.e. no losses since there is no conductivity. Usually optical/IR materials (glass, silica etc) dielectrics are considered of having zero conductivity compared to metals. In practice there is no perfect insulator and therefore perfect lossless material, but these definitions are based on relative numbers between conductors and insulators (lossless materials). This implies that the conductance of the conductor is so large in relationship to the conductance of the insulator, where the conductance of the insulator (or dielectric) is considered substantially zero (ideally zero for a perfect insulator).

Conductors are the other extreme compared to the lossless dielectrics. Conductors in principle have zero real part of their dielectric constant where the imaginary part of their dielectric constant is none zero and very large.

In between conductors and dielectrics, there exists a class of lossy materials (including semiconductors), having a dielectric constants with both real and imaginary portions available and this is what is used in the illustrative embodiments described herein.

Figure 4:
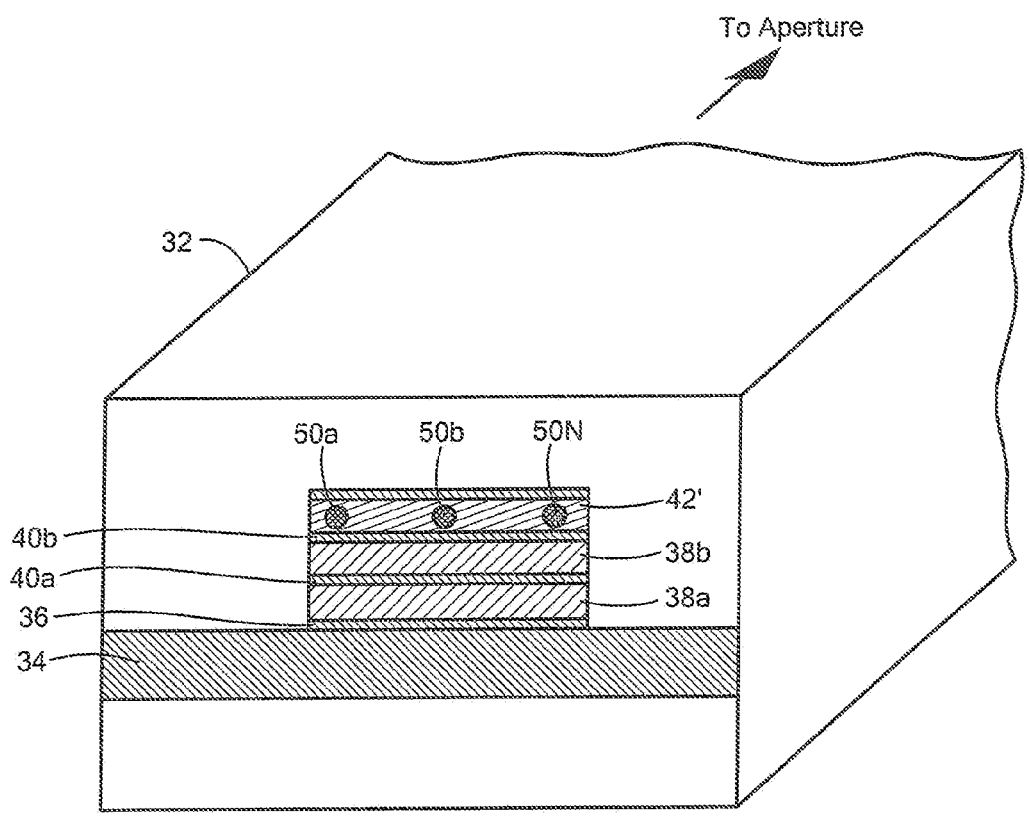
FIG. 4 is an isometric, partial, cross-sectional view of an ultra wide band (UWB) and optical feed circuit including light pipes.
Figure 5:
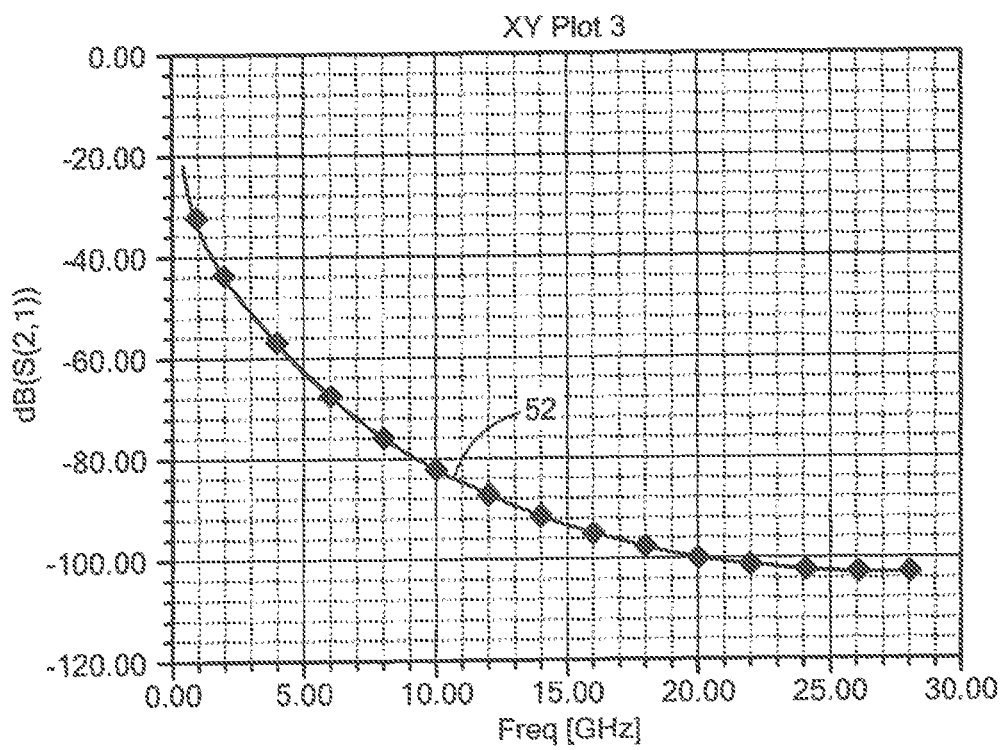
FIG. 5 is a plot of insertion loss vs. frequency for a conventional waveguide feed of the type shown in FIG. 1

In the illustrative embodiments described herein, the lossy materials values (dielectric constant) of 38a, 38b shown in FIG. 4, were chosen to generate the results of FIG. 5. If the dielectric constant value, of the lossy material of 38a, 38b in FIG. 4 is different from the chosen ones that we have, then the results of FIG. 5 will be different. Different lossy materials have different coupling effects.

As noted above, a tradeoff may be made between selection of the dielectric constants and thicknesses and they are related to the desired frequency ranges of operation in order to obtain the results of FIG. 5. If the layers are different, then the results of FIG. 5 will be different as well (due to the aforementioned tradeoff). The thickness of conductors 40a, 40b, 36 and 44, is related to the operating frequencies (RF regimes), skin effect and the type of metallic material (e.g. gold, nickel, bronze, etc.). The thickness of these conductors is usually smaller than the skin effect and that's why certain frequencies go through. In general, these conductors don't have to be the same and that depends on the particular design requirements.

For the illustrative design described herein and the results achieved in FIG. 5, the width of conductors 40a, 40b is selected to be the same as the width of substrates 38a, 38b. In other embodiments, the width of conductors 40a, 40b may be selected to differ from the width of substrates 38a, 38b as well as differ from each other. The illustrative embodiment described herein illustrates a structure and technique to have multiple frequencies and optics combined together. If the width of conductors 40a and 40b differ from the width of substrates 38a and 38b, the results may differ from the results described herein, and the particular widths to use in any application depend upon the particular design requirements and needs of the particular application. Conductors 40a and 40b are chosen because their specific conductivity and skin effects, combined with the range of frequencies of interest, give the results shown in FIG. 5. That implies if a different conductor (e.g. nickel) is selected (as opposed to copper), the results will not be the same as those shown in FIG. 5.

In the illustrative embodiment of FIG. 3, two (2) alternating dielectric layers 38a, 38b and corresponding conductive layers 40a, 40b are shown, but the particular number of alternating conductive layers and dielectric layers to use are selected to satisfy the needs of the particular application taking into account a variety of factors including, but not limited to the operating frequencies, dielectric constants, type of metallic conductors (copper, gold etc), and skin effect. It should also be mentioned that the dimensions of the metallic waveguide are a liming factor as well, since it is not possible to operate at frequencies lower than the cutoff waveguide frequencies which are dependent upon the dimensions of the waveguide, as is known. For example, if the lowest frequency supported by the waveguide is 5 GHz (i.e. the waveguide will not support dominant mode propagation of signals having a frequency lower than 5 GHz), then the laminations cannot operate at frequencies lower than that, since such laminations will not fit inside the waveguide. Therefore, the dimensions of the waveguide (as well as any waveguide loading materials or structures) determines the lowest frequency limit.

Figure 2:
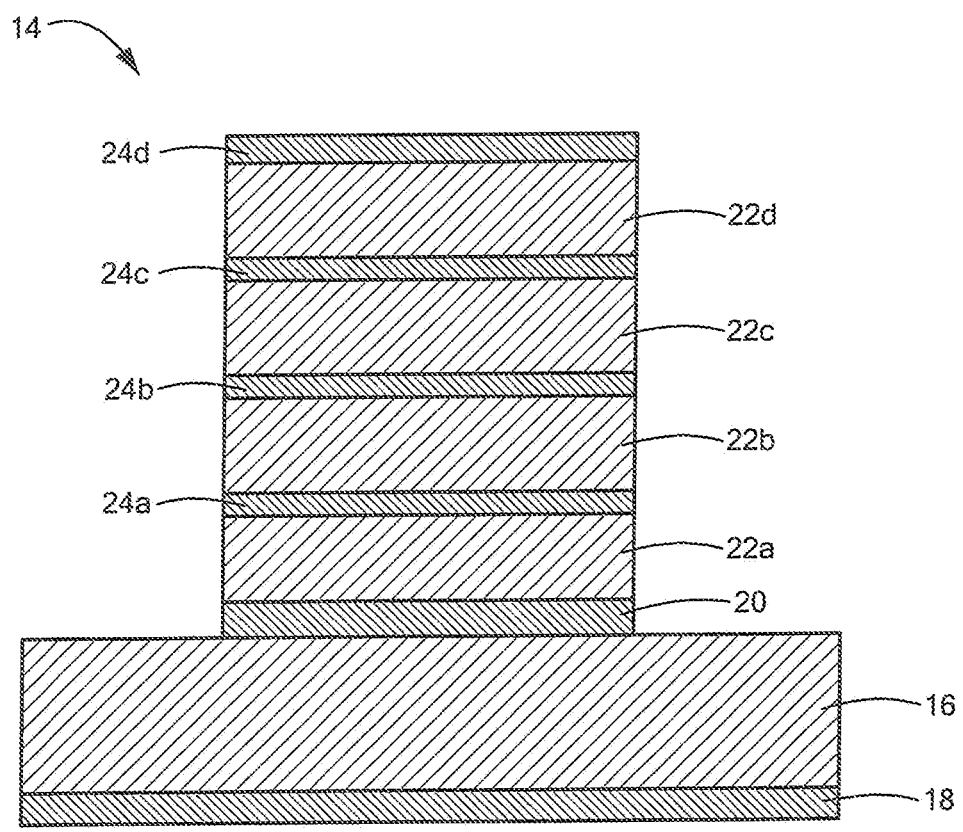
FIG. 2 is a side view of a prior art microstrip transmission line structure provided from multiple laminated conductors which form a composite conductor.

In principle, and as illustrated in prior art FIG. 2, the more the laminations the better the results, up to a certain number of course.

In accordance with the concepts, techniques and structures described herein, however, the same results of prior art techniques are achieved with a fewer number of laminations compared to same results with more laminations. That is, using the concepts, techniques and structures described herein the same results were achieved using a fewer number of laminations than needed using prior art techniques such as that shown in FIG. 2. Simultaneously, it was also possible to add an optical structure (e.g. layer 42, in FIG. 3).

Disposed over the top dielectric layer 38b is an optical waveguide 42 a conductor 44 is disposed over a top surface of the optical waveguide 42. Optical waveguide 42 is preferably provided from a substantially lossless material having a relatively low refractive index (e.g. real part) and substantially zero imaginary part. It should be appreciated that refractive index n, is the square root of the dielectric constant i.e.: $n=\sqrt{\varepsilon}$, where $\sqrt{\varepsilon}$ is the dielectric constant, which consists of the real and imaginary part. In fiber optics applications (materials), the dielectric constant has zero imaginary part which implies zero conductivity. The real part of n, is still low and usually for glass media is around 1.5; this is what is meant by low. If the index of refraction n, has a real part 3, or 4 for example, this is considered a 'high' value. Of course, the imaginary part is still almost zero, for these fiber optics applications ('almost', because in the real world practical systems, there is no perfect dielectric, but in most practical systems (e.g. fiber optics etc,) the imaginary part is taken as zero, because is extremely low.

Preferred materials have constant behavior at higher frequencies (i.e. the dielectric properties of the preferred materials do not substantially change). Such materials are described, for example, in "An Introduction to Optical Fibers", Allen H. Cherin.

It should be appreciated that disposing a substantially lossless material (i.e. optical layer 42) over dielectric layers 36a, 36b creates an improvement in the RF performance (i.e. increased frequency bandwidth and reduced insertion loss). In addition to such RF improvements, it is also possible to reduce the number of dielectric layers without degradation in performance. This leads to lower costs and less space. Placing an optical material over the multilayer dielectric layer increases RF bandwidth because the dielectric constant of the optical material loads' the waveguide/multilayer substrate. The optical material has substantially zero conductivity which helps reduce mutual coupling effects therefore generating desired results. As indicated above, the more the lossy the material the higher the coupling effects and this is not desirable in this case. In addition, the particular position of optical layer 42 (FIG. 3) is selected for the best results of FIG. 5. In other words, if optical layer 42, is located at the position of 38b in FIG. 3, the coupling effects will be different and therefore results of FIG. 5 will is expected to be worse.

Furthermore, in addition to increasing RF bandwidth, the insertion of the lossless dielectric waveguide slab 42 allows the introduction of optical/IR capabilities which creates significant advantage and improvements. It should be appreciated that in the illustrative embodiments described herein, an optical/IR material was selected to improve RF performance characteristics. In other words, the specific design of the optical/IR parts or optics (i.e. selection of relative dielectric constant) was not optimized. Since the material of substrate 42 is an optical/IR material (i.e. a dielectric, without any conductivity), this results in less coupling effects and therefore better RF performance for RF frequencies. The thickness choice for substrate 42 was also selected to improve RF performance characteristics.

In principle, the greater the thickness of substrate 42 (FIG. 4) the more optics which can be introduced. However, care must be taken so as to not degrade RF performance, because increasing the thickness of substrate 42, (FIG. 4), for example, is the equivalent of pushing conductor 44, FIG. 3 (or FIG. 4), closer to the upper horizontal surface of the waveguide causing coupling effects and therefore degrading performance (e.g. as compared with the results shown in FIG. 5).

As noted above, the dielectric constant of substrate 42 was chosen to be an optical/IR dielectric constant, (i.e. substantially zero conductivity or zero imaginary part of the dielectric constant) such that the material is optical/IR or lossless to signals in the RF range. The choice of the real part of the dielectric constant was initially chosen close to glass type of properties similar to those described in the reference: "An Introduction to Optical Fibers", Allen H. Cherin. In general, the substrate 42 (FIG. 4) may be provided as a group of layers of optical waveguides made of optical materials but with low real part of the dielectric constant (as noted above). An optical waveguide or a plurality of optical waveguides could be accommodated in the layer(s) depending upon the desired optical modes of interest. It should also be note that substrate 42, could also be an inhomogeneous optical dielectric to serve as a filter (e.g. an optical filter or an IR filter).

The thickness and width of conductor 44 (FIG. 3) was selected based upon the RF frequencies and in a similar way that the conductors 40b and 40a were selected and described earlier. Conductor 44 was also selected based upon skin depth and type of conductors such as copper, gold etc, which have different conductivities. Again, these are the same design criteria in relationship to conductors 40b, 40a and 36 and the main focus was the range of RF frequencies, the remaining factors, i.e. skin depth and type of metal (copper, gold, etc) were are also dictated by the range of the RF frequencies. Although any type of conductor having characteristics which are the same as or similar to copper or gold, may be used, to achieve the results shown in FIG. 5, copper conductors were used. If the material of conductor 44 (FIG. 3) is changed from copper to nickel, for example, the results will not be the same as those shown in FIG. 5, because nickel has a different conductivity and skin effect compared to copper. In this particular case, the results achieved using nickel (and keeping all other parameters the same) would likely be degraded as compared to the results shown in FIG. 5.

In summary, the optical substrate 42 serves as an optical waveguide slab and is disposed over a multi-layer dielectric substrate 36a, 36b with each layer being provided from a material having a relatively low relative dielectric constant. Conductor layers 40a, 40b are disposed between at least a pair of the dielectric substrates which make up the multi-layer dielectric substrate. The multi-layer dielectric substrate is, in turn, disposed over a suspended air stripline (SAS) signal path comprised of a substrate 34 having a conductor 36 disposed thereover. The optical substrate, multi-layer dielectric substrate and SAS are disposed in the waveguide 32. The multi layered feed lines support operation at multiple RF frequencies because of the skin effect of the metallic layers at various frequencies while the optical substrate disposed over the multi layered feed lines increases the frequency bandwidth over which the RF feed would otherwise operate. Furthermore, disposing the optical substrate over the multi layered feed lines allows optical/IR signals to propagate through the RF waveguide and subsequently be provided to an aperture.

This results in an ultra wideband (UWB) feed line. By combing a multilayered RF feedline substrate with an optical substrate and disposing the combination in a waveguide, a UWB feed capable of feeding an antenna with a waveguide aperture while also supporting signals at multiple frequencies/wavelengths (including optical/IR wavelengths) is provided. By including both optical and RF substrate materials in the RF waveguide, a waveguide feed circuit is provided which supports propagation of signals at both RF and optical/IR wavelengths. Including the optical substrate in the waveguide widens the frequency bandwidth over which the RF portion of the feed operates and makes the RF feed portion UWB.

Disposing the optical substrate over the multilayer substrate adds significant capabilities including, but not limited to use of the optical substrate as an optical waveguide that feeds an optical device (lens, etc). Such an optical device may be disposed at a center of an antenna aperture, for example. Furthermore, including the optical substrate among the feed lines improves RF insertion loss and bandwidth performance as compared to insertion loss and bandwidth performance which may be achieved using prior art approaches. Furthermore, inclusion of the optical substrate in a waveguide allows a combination of optical/IR and RF fed antenna apertures wherein the optical/IR and RF fed apertures are co-located (i.e. a waveguide fed aperture which includes both optics and RF collocated in a single waveguide aperture).

The structures and techniques described herein make it possible to co-locate RF and optics without interfering with each other. Thus, including the optical substrate in an RF waveguide allows both RF and optical apertures to be fed and thus creates opportunities in the optical/IR areas. Furthermore, as noted above, the structure and techniques described herein result in space savings which can be used by other applications or structures, if necessary. The UWB-optical/IR feed line described herein thus enables the development of multi-mode sensors (e.g. dual-mode sensors—RF and optical sensors) in a compact package.

Referring now to FIG. 4 in which like elements of FIG. 3 are provided having like reference designations, a UWB/optical feed 30 includes an optical waveguide 42 having one or more optical pipes 50a-50N (e.g. optical fibers) disposed or otherwise provided therein. It should be noted that different optical/IR modes can propagate through optical pipes 50a, 50b, 50N, and simultaneously have different optical/IR modes going through the rectangular optical/IR waveguide. Optical/IR pipe 50a, could be a "step index" optical fiber, where optical/IR pipe 50b could be a "graded index" optical fiber, where along the path of the rectangular waveguide, we could have other optical devices. It should also be mentioned that there exists a spectrum of frequencies between IR and optical regimes. The optical pipes may be selected having dimensions selected to support different optical frequencies and/or different polarizations. Thus, each optical pipe can carry different wavelengths/polarizations and/or the pipes support different wavelengths/polarizations than the optical waveguide.

The UWB/optical structure is suitable for use with a variety of different types of fiber waveguide lines. The optical fibers may be provided as step-index or graded index fibers disposed over a dielectric slab waveguide.

In embodiments in which the optical substrate 42 is provided having one or more optical light pipes disposed, formed or otherwise provided therein, some or all of the one or more light pipes may be selected to propagate light at the same wavelength. Alternatively, in some embodiments, each of the one or more light pipes may be selected to propagate light at different wavelengths. Alternatively still, in some embodiments, some of the one or more light pipes may be selected to propagate light having a first wavelength while others of the one or more light pipes may be selected to propagate light having different wavelengths (e.g. different from the first wavelength and also different from each other).

Furthermore, in some embodiments, all of the one or more light pipes may be selected to propagate light having the same polarization. Alternatively, in some embodiments, some or all of the one or more light pipes may be selected to propagate light having a first polarization (i.e. the same polarization) while others of the one or more light pipes may be selected to propagate light having different polarizations (e.g. different from the first polarization and also different from each other). Alternatively still, in some embodiments, each of the one or more light pipes may be selected to propagate light having different polarizations. Alternatively still, some of the one or more light pipes may be selected to propagate light of different polarizations while others of the one or more light pipes may be selected to propagate light of the same polarization. Thus, the UWB feed line described herein adds polarization capabilities.

This is in contrast to prior single feed lines which allow propagation of signals only having one polarization.

Figure 1:
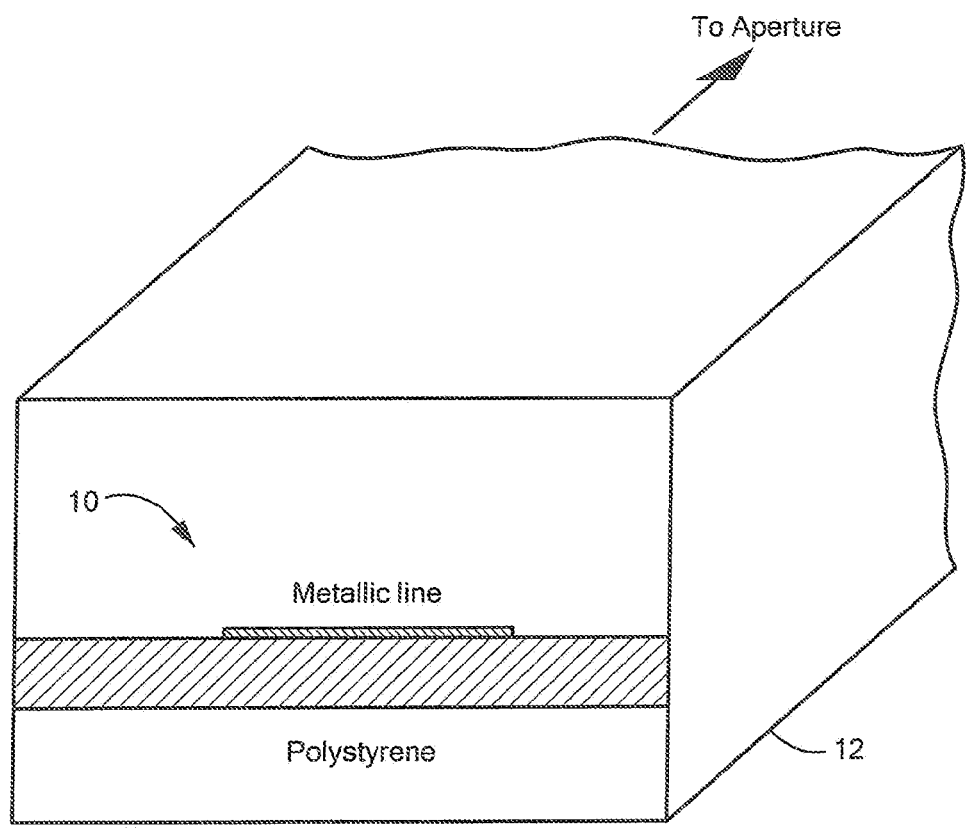
FIG. 1 is an isometric, partial, cross-sectional view of a prior art suspended air stripline feed line disposed in a waveguide transmission line.
Figure 5A:
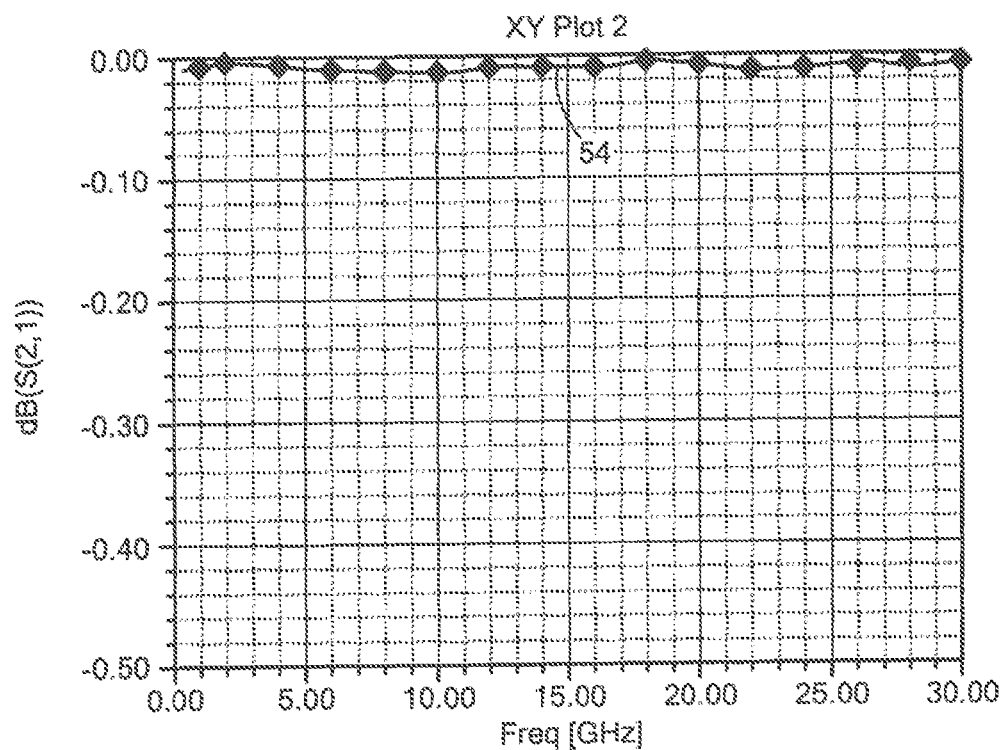
FIG. 5A is a plot of insertion loss vs. frequency for a UWB/optical feed of the type shown in FIGS. 3 and 4.

Referring now to FIGS. 5 and 5A, curve 52 corresponds to insertion loss vs. frequency for a conventional waveguide feed of the type shown in FIG. 1. Curve 54 corresponds to insertion loss vs. frequency for a UWB/optical waveguide feed circuit of the type shown in FIGS. 3 and 4. Comparing curve 52 to curve 54 shows a significant increase in performance for the UWB feed over the prior art approach of FIG. 1.

It should be appreciated that the structures and techniques described herein can be applied in existing apertures or array apertures and thus can significantly improve existing products. The structures and techniques described herein find use in applications operating in frequencies starting at 10 GHz and higher, but can also be applied to lower frequency applications and waveguides.

The systems, circuits and techniques described herein have application in a wide variety of different applications. For example, the antenna assembly may include active or passive antenna elements for missile sensors that require bandwidth, higher gain to support link margin, and wide impedance bandwidth to support higher data-rates, within a small volume. They may also be used as antennas for land-based, sea-based, or satellite communications. Because RF systems having small volume are possible due to the co-located RF/optical feed configuration described herein, the systems are well suited for use on small missile airframes. RF systems utilizing the concepts, systems and circuits described herein may also be used in, for example, handheld communication devices (e.g., cell phones, smart phones, etc.), commercial aircraft communication systems, automobile-based communications systems (e.g., personal communications, traffic updates, emergency response communication, collision avoidance systems, etc.), Satellite Digital Audio Radio Service (SDARS) communications, proximity readers and other RFID structures, radar systems, global positioning system (GPS) communications, and/or others. In at least one embodiment, the concepts, systems and circuits described herein may be adapted for use in medical imaging systems. The RF systems described herein may be used for both transmit and receive operations. Many other applications are also possible. For example, structures and techniques described herein can be applied in small devices that combine optics (cameras) and RF sensors. Another commercial application would be a cable that combines a high bandwidth fiber optic data transmission line with a backwards compatible multi-frequency RF channel. The structures and techniques described herein find use in both commercial and non=commercial (e.g. military) applications.

It should of course be understood that while the present technology has been described with respect to disclosed embodiments, numerous variations, alternate embodiments, equivalents, etc. are possible without departing from the spirit and scope of the claims. For example, any of a number of elements may be used in the phased array.

In addition, it is intended that the scope of the present claims include all other foreseeable equivalents to the elements and structures as described herein and with reference to the drawing figures. Accordingly, the subject matter sought to be protected herein is to be limited only by the scope of the claims and their equivalents.

Having described preferred embodiments which serve to illustrate various concepts, structures and techniques, which are the subject of this patent, it will now become apparent to those of ordinary skill in the art that other embodiments incorporating these concepts, structures and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

Accordingly, it is submitted that that scope of the patent should not be limited to the described embodiments, but rather should be limited only by the spirit and scope of the following claims.

All publications and references cited herein are expressly incorporated herein by reference in their entirety.

What is claimed is:

1. A feed circuit comprising:
   a waveguide having dimensions selected to propagate radio frequency (RF) signals;
   a suspended air stripline (SAS) signal path comprising a substrate having first and second opposing surfaces and a conductor disposed over a first one of the first and second opposing surfaces, said SAS signal path disposed in said waveguide;
   a multi-layer dielectric substrate with each layer being provided from a material having a relatively low relative dielectric constant, said multi-layer dielectric substrate having a first surface disposed over the conductor of said SAS signal path and a second, opposite surface;
   conductor layers disposed between at least a pair of dielectric substrates which make up said multi-layer dielectric substrate; and
   an optical substrate which forms an optical waveguide, said optical substrate disposed over the second surface of said multi-layer dielectric substrate, wherein dimensions of the optical substrate are selected to reduce coupling effects within the waveguide.

2. The feed circuit of claim 1 wherein said optical substrate is provided from a lossless material having a low refractive index with an imaginary portion of its dielectric constant almost zero.

3. The feed circuit of claim 1 wherein said RF waveguide is provided as a rectangular waveguide.

4. The feed circuit of claim 1 wherein said optical substrate is provided having one or more light pipes provided therein.

5. The feed circuit of claim 4 wherein at least some of said one or more light pipes propagate light at the same wavelength.

6. The feed circuit of claim 4 wherein at least some of said one or more light pipes propagate light having a first wavelength while others of the one or more light pipes propagate light having different wavelengths.

7. The feed circuit of claim 4 wherein each of said one or more light pipes propagate light having different wavelengths.

8. The feed circuit of claim 4 wherein at least some of said one or more light pipes propagate light having the same polarization.

9. The feed circuit of claim 4 wherein at least some of said one or more light pipes propagate light having a first polarization while others of the one or more light pipes propagate light having a different polarization.

10. The feed circuit of claim 4 wherein each of said one or more light pipes propagate light having different polarizations.

* * * * *